United States Patent
Nakatani et al.

(10) Patent No.: US 7,005,304 B2
(45) Date of Patent: Feb. 28, 2006

(54) MICRO-MOVING DEVICE AND ITS MANUFACTURING METHOD

(75) Inventors: Masaya Nakatani, Hyogo (JP); Katsuya Morinaka, Osaka (JP); Katsumasa Miki, Osaka (JP); Hirofumi Tajika, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 254 days.

(21) Appl. No.: 10/362,913

(22) PCT Filed: Jun. 26, 2002

(86) PCT No.: PCT/JP02/06433

§ 371 (c)(1),
(2), (4) Date: Aug. 1, 2003

(87) PCT Pub. No.: WO03/003369

PCT Pub. Date: Jan. 9, 2003

(65) Prior Publication Data

US 2004/0100735 A1    May 27, 2004

(30) Foreign Application Priority Data

Jun. 29, 2001   (JP)   ............................. 2001-198156

(51) Int. Cl.
*H01L 21/00* (2006.01)

(52) U.S. Cl. ............................. 438/5; 438/10; 438/118; 438/928; 310/311; 360/294.4

(58) Field of Classification Search ................ 438/5, 438/10, 118, 928; 310/311; 360/294.4
See application file for complete search history.

(56) References Cited

U.S. PATENT DOCUMENTS

| | | | | |
|---|---|---|---|---|
| 6,289,564 | B1 * | 9/2001 | Novotny | 29/25.35 |
| 6,532,138 | B1 * | 3/2003 | Koganezawa | 360/294.4 |
| 6,552,878 | B1 * | 4/2003 | Sato et al. | 360/294.4 |
| 6,597,541 | B1 * | 7/2003 | Nishida et al. | 360/294.4 |
| 2001/0021086 | A1 * | 9/2001 | Kuwajima et al. | 360/294.4 |
| 2001/0038515 | A1 * | 11/2001 | Koganezawa et al. | 360/294.4 |

FOREIGN PATENT DOCUMENTS

| | | |
|---|---|---|
| JP | 6-338673 | 12/1994 |
| JP | 2000-218783 | 8/2000 |
| JP | 2000-299510 | 10/2000 |
| JP | 2001-43641 | 2/2001 |

* cited by examiner

*Primary Examiner*—Trung Dang
(74) *Attorney, Agent, or Firm*—Wenderoth, Lind & Ponack, L.L.P.

(57) ABSTRACT

A micro-transfer device for fine positioning is employed typically in recording and playback apparatus for recording disks. Voltage is stably supplied to an expandable element which displaces the position of a recording head by applying voltage. An end different from one end connected to a base, where the recording head is mounted, is fixed to a fixing substrate for preventing changes in dimensions of the expandable element. An external electrode connection for supplying voltage to the expandable element is provided in an area on the fixing substrate.

22 Claims, 7 Drawing Sheets

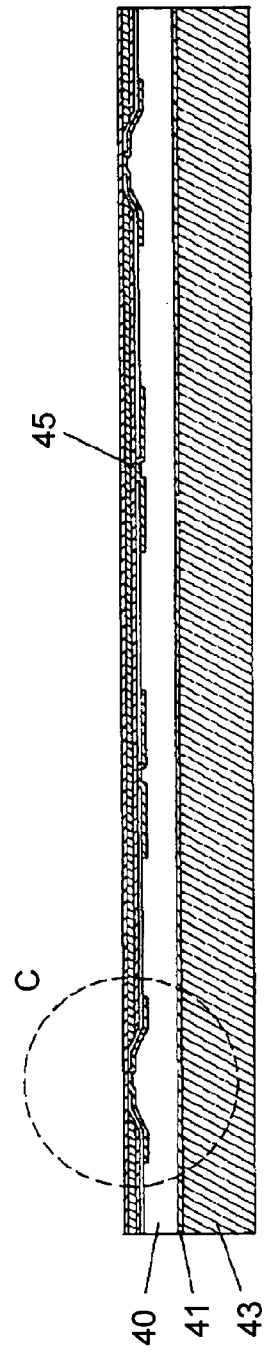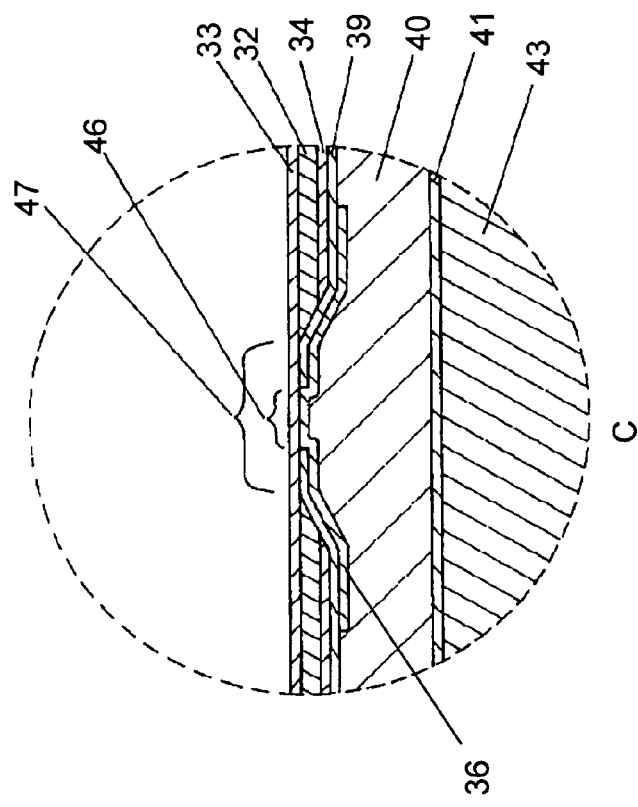
FIG. 7A
FIG. 7B

MICRO-MOVING DEVICE AND ITS MANUFACTURING METHOD

TECHNICAL FIELD

The present invention relates to micro-transfer devices and their manufacturing methods for highly accurate transfer of the recording heads of devices that require high precision positioning such as recording and playback apparatus for magnetic recording media, optical recording media, magneto-optical recording media, and the like.

BACKGROUND ART

Information technology including personal computers has been rapidly advancing in recent years, and similar progress has been made in peripherals attached to personal computers. In particular, the capacity of magnetic recording apparatus for storing data is increasing year by year, and thus high density recording is in demand for magnetic recording disks for storing information. Accordingly, an area recording density of 20 $GB/cm^2$ or higher is required on magnetic recording disks. This means that adjacent pieces of recorded information need to be aligned at a pitch of 1 μm.

A magnetic head is used for writing data to or reading data from the magnetic recording disk. This magnetic head is supported by a head supporting mechanism. The magnetic head is moved to the desired position by scanning this head supporting mechanism over the plane of the magnetic recording disk. Accordingly, the magnetic head needs to be positioned to a high degree of precision for writing or reading high-density information.

In addition to increased capacity, high-speed information reading and writing are needed in magnetic recording apparatus. This requires the magnetic recording disk to be rotated at high speed and the magnetic head to be positioned at high speed.

However, high-precision positioning of a magnetic head is difficult to control when it is scanned at high speed by means of a conventional head supporting mechanism. On the other hand, the magnetic head is difficult to move at a high speed when it is highly accurately controlled. In other words, it is becoming difficult to satisfy the requirement that a magnetic recording unit be able to record a large volume of data at high speed on a disk.

The reason for the difficulties in achieving high-speed transfer and high-precision control of the magnetic head are briefly described next. In the latest large-capacity magnetic recording apparatus, the magnetic recording disk is rotated at high speed and the magnetic head moves horizontally to the magnetic recording disk to a position where information is recorded (or to be recorded) by the supporting mechanism of the magnetic head. However, the high-speed horizontal movement generates a large inertial force on the magnetic head attached to the tip of the head supporting mechanism, making it difficult to halt it precisely at the predetermined position.

One proposed method for correcting this positional deviation of the magnetic head caused by the inertial force is a micro-transfer device which uses a piezoelectric element at the tip of the head supporting mechanism. An electrode for changing the shape of the piezoelectric element is formed directly on the piezoelectric element, and the shape of the piezoelectric element naturally changes when voltage is supplied to the piezoelectric element. This means the shape of the voltage feeder also changes, making the voltage supply unstable.

DISCLOSURE OF INVENTION

An object of the present invention is to offer a micro-transfer device that stably supplies voltage and its manufacturing method.

To achieve this object, the present invention fixes an expandable element onto a fixing substrate at one of its end faces to counteract any change in the dimensions of the expandable element. The other end face of the expandable element is connected to a base for mounting the recording head. An external electrode connection for supplying voltage for changing dimensions of the expandable element is provided on a part of the expandable element fixed to this fixing substrate.

Accordingly, the micro-transfer device provided at the tip of the head supporting mechanism for finely adjusting the position of magnetic head is firmly fixed on the fixing substrate, even when the head supporting mechanism moves at high speed. Since a voltage signal is sent from the external electrode connection provided on this fixing substrate to an electrode pad on a flexible substrate, the shape of the voltage feeder does not change during high-speed movement of the head supporting mechanism. The voltage can thus be supplied reliably, facilitating fine adjustment of the recording head position.

BRIEF DESCRIPTION OF THE DRAWINGS

FIGS. 7A and 7B are magnified section views of a part concerned of the micro-transfer device in accordance with the second exemplary embodiment of the present invention.

DETAILED DESCRIPTION OF THE INVENTION

Figure 1:
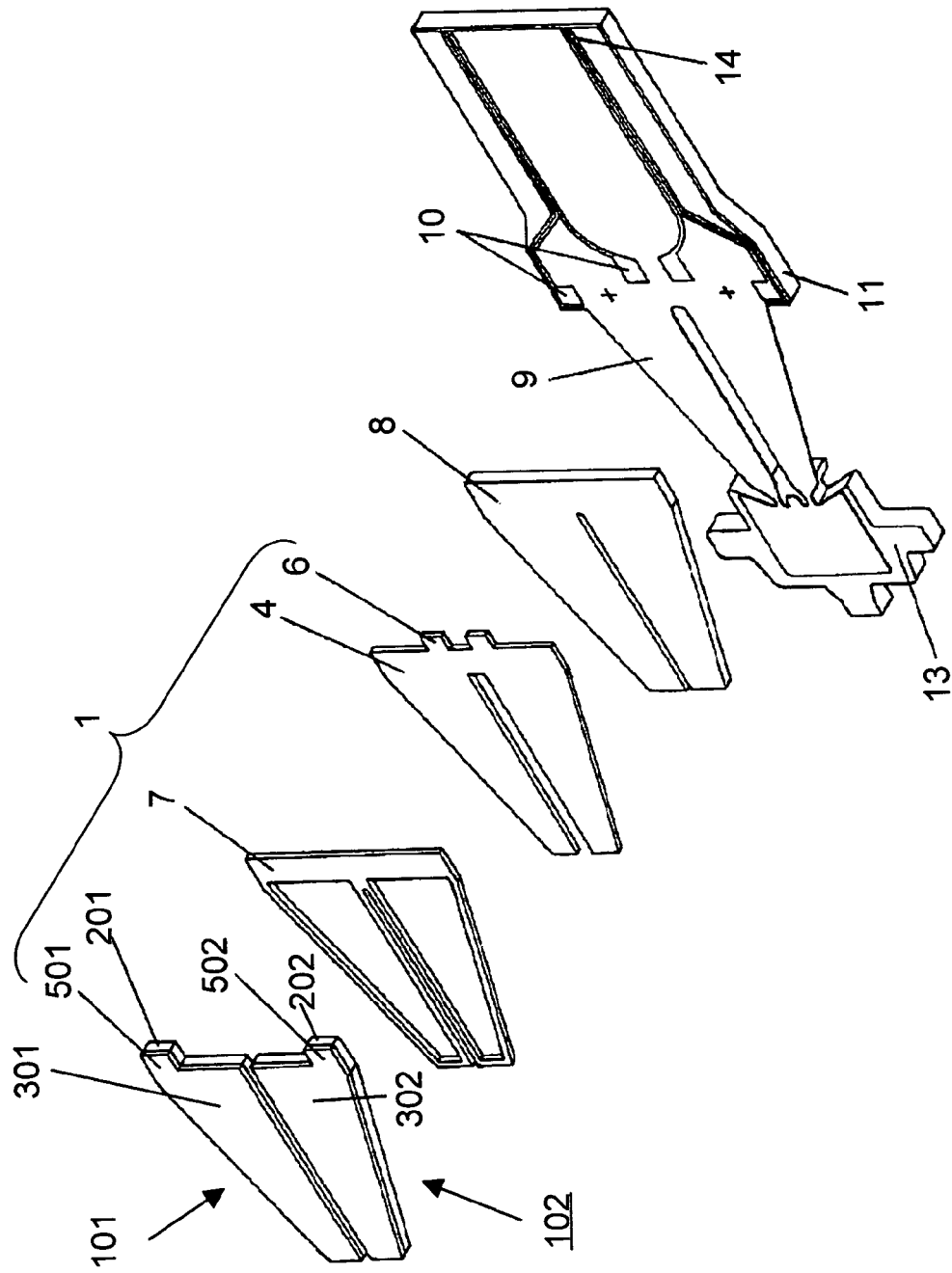
FIG. 1 is an exploded perspective of a micro-transfer device in accordance with a first exemplary embodiment of the present invention.

Exemplary embodiments of the present invention are detailed below.

In the present invention, an expandable element is firmly fixed on a fixing substrate in a way such that the dimensions of the expandable element do not change as a result of applying a voltage to one end face of the expandable element. The other end face of the expandable element is connected to a base on which the recording head is mounted.

An external electrode connection for supplying the voltage to the expandable element is provided on this area of the expandable element fixed to this fixing substrate. Since the dimensions of the expandable element at the area fixed to the fixing substrate do not change, the shape of the external electrode connection does not change. This establishes stable and secure electrical connection between the external electrode connection and flexible substrate. Accordingly, the voltage is supplied to the expandable element in a highly reliable fashion.

In the present invention, a first driving electrode is formed on the face opposite to the face facing the flexible substrate of the piezoelectric member. This first driving electrode has almost the same shape and area as the piezoelectric member. The first driving electrode and piezoelectric member with almost the same shape enable the uniform and efficient supply of voltage to the entire face of the piezoelectric member.

In the present invention, the expandable element is a piezoelectric element configured with the first driving electrode, piezoelectric member, second driving electrode, and insulator. The insulator is provided to at least a part of the area between the piezoelectric member and second driving electrode. This insulator has a frame shape in which its outer dimension is larger than the piezoelectric member in an area facing the flexible substrate, and its inner dimension is smaller than the piezoelectric member. The insulator covers the entire piezoelectric member in an area of the expandable element placed on the fixing substrate. Since the insulator is formed only on the periphery of the piezoelectric member on the flexible substrate, the second driving electrode contacts the piezoelectric member in an area where the piezoelectric member can practically expand or contract, achieving maximum expansion or contraction. The insulator prevents electrical shorting between the first and second driving electrodes at the ends.

Moreover, in the present invention, the external electrode connection is formed on a respective end of the first and second driving electrodes at an area where these electrodes are fixed to the fixing substrate, and a part of the external electrode connection of the second driving electrode protrudes from the outline of the insulator. The formation of the external electrode connection on the end of the first and second driving electrodes and protrusion of a part of the external electrode connection of the second driving electrode from the outline of the insulator allow the use of conductive paste for electrically connecting from the first driving electrode side to an electrode pad provided on the flexible substrate side.

Still more, in the present invention, the insulator is formed at a lower part of the second driving electrode, and a through hole for exposing a part of the second driving electrode is provided on the insulator at the area where the expandable element is fixed onto the fixing substrate. The formation of an area for exposing the second driving electrode in this area where the insulator is fixed onto the fixing substrate achieves electrical connection of a second lead-out electrode through the exposed area of the second driving electrode. In other words, the voltage can be supplied to the second driving electrode from the flexible substrate.

Still more, in the present invention, the piezoelectric member, first driving electrode, and second driving electrode which configures the piezoelectric element, i.e., the expandable element, have almost the same size, area, and shape. A voltage signal is applied uniformly and efficiently on the entire piezoelectric member by employing the same shape for the first driving electrode, piezoelectric member, and second driving electrode.

Still more, in the present invention, a through hole is created on a part of the insulator in an area where the expandable element is fixed onto the fixing substrate. A part of the second driving electrode is thus exposed, and the second lead-out electrode and the second driving electrode are electrically connected at this exposed area. The second lead-out electrode has the external electrode connection at an end opposite to that connected to the second driving electrode, and this external electrode connection is provided at a portion facing the electrode pad of the flexible substrate. The voltage can be supplied from the flexible substrate by leading the second driving electrode to the flexible substrate side using the second lead-out electrode.

Still more, in the present invention, a through hole is created on the second driving electrode, piezoelectric member, and insulator at least at a part of their area disposed on the fixing substrate. The through holes made on the second driving electrode and piezoelectric member have a narrower hole diameter at the first driving electrode side, and the hole diameter of the through hole made on the insulator is smaller than those of the second driving electrode and piezoelectric member at the first driving electrode side. The first lead-out electrode is formed in a way to cover the through hole on the insulator. The external electrode connection is formed on one end of the first lead-out electrode, and this external electrode connection is facing the electrode pad on the flexible substrate. The insulator securely covers around the through-holes on the first driving electrode and piezoelectric member by making the hole diameter of the through-holes on the second driving electrode and piezoelectric member narrower at the first driving electrode side, and also by making the hole diameter on the insulator smaller than this narrowed hole diameter. Disconnection of the first lead-out electrode in the through-hole is thus reduced, and the occurrence of electrical shorting with the second driving electrode is also eliminated.

Still more, in the present invention, a part of the external electrode connection of one of the first driving electrode, second driving electrode, second lead-out electrode, and first lead-out electrode is exposed from an adhesive member which bonds the expandable element and flexible substrate. Since a part of the external electrode connection of the electrode is exposed from the adhesive member, the voltage can be supplied from the flexible substrate side even after forming the adhesive member. This facilitates electrical connection with the electrode pad on the flexible substrate.

Still more, in the present invention, an end face of an exposed portion is disposed at a distance greater than the film thickness of the adhesive member from the end face of the external electrode connection of this electrode. Since the external electrode connection is exposed from the end of the adhesive member for a distance greater than the film thickness of the adhesive member, the exposed external electrode connection of the electrode can be flexibly bent, allowing connection to the electrode pad on the flexible substrate so as to cover the end face of the adhesive member. Consequently, electrical connections of these parts are further facilitated.

Still more, in the present invention, the electrode pad on the flexible substrate has a protrusion. This protrusion has an area smaller than that of the exposed external electrode connection, and the exposed connection and the protrusion are disposed at positions facing each other on the expandable element and flexible substrate respectively. Since the exposed external electrode connection made by removing the adhesive member and the protrusion on the flexible substrate are formed at exactly overlapping positions to face each other, the expandable element and flexible substrate can be positioned. This facilitates positioning of these parts.

Still more, in the present invention, the protrusion is made of a conductive material, and its protruding height is greater than the film thickness of the adhesive material. The protrusion made of a conductive material completes positioning of the exposed external electrode connection of the expandable element and the protrusion of the electrode pad on the flexible substrate, and their electrical connection at the same time, facilitating electrical connection.

Still more, the present invention has at least two or more expandable elements and flexible substrates respectively, and the second driving electrode of the first expandable element and the second driving electrode of the second expandable element are electrically shorted. This electrical shorting of these parts facilitates checking of positioning and correct electrical connection between the external electrode connection and electrode pad at completion of the positioning and electrical connection of the external electrode connection of expandable element and the electrode pad on the flexible substrate. The checking is made possible just by measuring electrical resistance between electrode pads connected to the second driving electrode of the first expandable element and the second driving electrode of the second expandable element.

Still more, in the present invention, the piezoelectric member is made mainly of lead zirconate titanate, and the first and second driving electrodes are mainly made of platinum (Pt). Since lead zirconate titanate is sandwiched by Pt from both sides, the electromotive force between metals does not occur between the first driving electrode and the second driving electrode. This prevents corrosion of lead zirconate titanate by the local cell mechanism.

Still more, in the present invention, the insulator is mainly made of polyimide. The dielectric constant of polyimide used for the insulator is far lower than that of lead zirconate titanate, and thus the voltage is not applied to the piezoelectric member at a portion where polyimide is inserted even the the voltage is supplied between the first and second driving electrodes by inserting polyimide between the piezoelectric member and the second driving electrode. Accordingly, deformation of the piezoelectric member is preventable.

Still more, in the present invention, the first or second lead-out electrode is made mainly of gold (Au). The use of Au for the lead-out electrode allows the patterning of the second lead-out electrode and first lead-out electrode without damaging the first driving electrode, second driving electrode, or insulator when they are etched in the photolithography process.

Still more, in the present invention, a magnesium oxide mono-crystalline substrate is used as a substrate for the expandable element. A material layer mainly made of Pt is sputtered on the mono-crystalline substrate as the first conductive layer, a material layer mainly made of lead zirconate titanate is sputtered as a piezoelectric layer, and then the magnesium oxide mono-crystalline substrate is removed by etching. A high quality Pt layer and lead titanate zirconate layer can be formed by forming layers mainly made of Pt and lead titanate zirconate respectively as the first conductive layer and piezoelectric layer on the magnesium oxide mono-crystalline substrate using sputtering which is a general means for forming a thin film. In addition, multiple expandable elements can be formed at once on the same substrate.

Still more, in the present invention, the piezoelectric member and the first driving electrode are etched into almost the same shape by photolithography using the same photo mask after sputtering the first conductive layer and piezoelectric layer on the magnesium oxide mono-crystalline substrate. Patterning of the piezoelectric layer and first driving electrode simultaneously using the same mask eliminates the need for changing and positioning a mask for each layer. This achieves more efficient production.

Still more, in the present invention, the insulator formed on the flexible substrate has a frame shape whose outer dimensions are larger than the piezoelectric member, and whose inner dimensions are smaller than the piezoelectric member. A part of the insulator fixed onto the fixing substrate is patterned using the photolithography in a way to cover the entire piezoelectric member. Accordingly, the insulator covers only an end of the expandable element in an area fixed to the fixing substrate. This allows direct formation of the second driving electrode on the piezoelectric member for effective driving. In addition, electrical shorting of the first driving electrode and second driving electrode is preventable at the end area of the piezoelectric member.

Still more, in the present invention, a conductive layer typically made of platinum (Pt), chrome (Cr), copper (Cu), or gold (Au) is sputtered or deposited as the second conductive layer after forming the insulator. At least a part of the second driving electrode to be fixed to the fixing substrate is patterned in a way to protrude from the outline of the insulator by photolithography. The second driving electrode is thus patterned in a way to protrude from the insulator at an area to be fixed to the fixing substrate at forming and patterning the conductive layer such as Pt, Cr, Cu, or Au as a second driving electrode layer. After the expandable element is formed on the magnesium oxide mono-crystalline substrate, the magnesium oxide mono-crystalline substrate is removed by etching. Since the second driving electrode protrudes from the end of the insulator, it is exposed to the first driving electrode side. Accordingly, both the first driving electrode and the second driving electrode can be drawn out from the same face opposite to the flexible substrate.

Still more, in the present invention, the first conductive layer of the expandable element and the piezoelectric layer are sputtered, and then Pt is sputtered as the second conductive layer under the same conditions as the first conductive layer. Using the same photo mask, the first driving electrode, piezoelectric member, and second driving electrode are patterned to have almost the same shape by dry-etching. Since the first conductive layer and second conductive layer are sputtered on the magnesium oxide mono-crystalline substrate under the same conditions, a film stress caused by interaction between these layers and magnesium oxide mono-crystalline substrate is generated in the same direction. Non-discrepant stress thus improves the film adhesivity.

Still more, in the present invention, the piezoelectric member, and first and second driving electrodes are patterned, the insulator having a through-hole is formed in a way such that a part of the second driving electrode is exposed, and then a material layer mainly made of one of Al, Cr, titanate, or Au is deposited as the second lead-out electrode by photolithography and patterned in a way to cover the through-hole. Since the second lead-out electrode is formed in a way to cover around the through-hole on the insulator by photolithography, the second driving electrode can be securely drawn out at the through-hole, achieving a highly reliable electrical connection. In addition, patterning by photolithography allows the formation of multiple external electrode connections at once.

Still more, in the present invention, a through-hole is dry-etched on the first driving electrode and piezoelectric member by using the same photo mask for a photo resist. The use of the same mask eliminates the need for positioning the mask after it is changed. In addition, the use of the photo resist for dry etching gives an inclination to the wall of the through-hole. This eliminates disconnection on the wall end of the through-hole when the insulator and first lead-out electrode are formed.

Still more, in the present invention, an adhesive member is patterned using photolithography in a way to expose a part of the external electrode connection after forming the expandable element on the magnesium oxide mono-crystalline substrate. The electrode can be drawn out from the flexible substrate side even after forming the adhesive member by patterning the adhesive member by photolithography in a way to expose a part of the external electrode connection of the expandable element upon applying adhesive. In addition, the external electrode connection can be bent after removing the magnesium oxide mono-crystalline substrate by etching. The external electrode connection can cover the end of the adhesive member by providing a distance at least larger than the film thickness of the adhesive member between the end face of the adhesive member and the end of the external electrode connection of the expandable element upon patterning of the adhesive material. This facilitates electrical connection with the electrode pad on the flexible substrate. Moreover, a small gap is created between the external electrode connection and the electrode pad on the flexible substrate by exposing a part of the external electrode connection from the adhesive member even when the bending of the external electrode connection is insufficient. This enables application of conductive paste into this gap after the magnesium oxide mono-crystalline substrate is removed by etching, further ensuring electrical connection between the external electrode connection and electrode pad.

Still more, in the present invention, a pattern is adjusted upon pasting onto the flexible substrate, after patterning the adhesive member, by matching the exposed area formed on the external electrode connection of the expandable element and the protrusion formed on the electrode pad of the flexible substrate. Positioning of the expandable element and flexible substrate is completed just by fitting the exposed area, which is concave, formed on the external electrode connection of the expandable element and the protrusion formed on the electrode pad of the flexible substrate. This achieves easy overlaying and positional adjustment.

Still more, in the present invention, whether positions of the external electrode connection of the flexible substrate and the electrode pad of the expandable element are overlaid is checked by measuring electrical resistance between connectors formed on the flexible substrate when the external electrode connection of the flexible substrate and the electrode pad of the expandable element are bonded. When two or more expandable elements are provided, the second driving electrode of the expandable element is electrically connected in advance, and electrical resistance between electrodes drawn out to the flexible substrate is measured after being bonded onto the flexible substrate. This facilitates checking whether the expandable element and flexible substrate are electrically connected in the external electrode connection. In other words, electrical resistance in the shorted state signals the completion of positioning. Accordingly, the positioning process and external electrode connection process are extremely simplified.

Still more, in the present invention, electrical capacitance between electrodes formed on the flexible substrate is measured for checking that positions of the external electrode connection on the flexible substrate and the electrode pad of the expandable element are overlaid when they are bonded. Positioning and electrical connection of the external electrode connection and electrode pad are easily checked by measuring electrical capacitance between the electrode pads on the flexible substrate respectively connected to the first driving electrode and the second driving electrode of the expandable element when the first driving electrode of the expandable element is drawn out to the flexible substrate side by the first lead-out electrode. In addition, whether the capacitance characteristic of each expandable element is normal can be checked. Accordingly, a process to evaluate the micro-transfer device is extremely simplified.

Furthermore, in the present invention, the expandable element formed on the magnesium oxide mono-crystalline substrate is bonded together with the entire magnesium oxide mono-crystalline substrate using the adhesive member. This magnesium oxide mono-crystalline substrate is removed using a solution mainly made of phosphate, and then the exposed external electrode connection of the expandable element and the external electrode connection of the flexible substrate are electrically connected by conductive paste. When the outline of the external electrode connection is formed in a way to protrude from the outline of the insulator, all external electrode connections of the expandable element are exposed at the first driving electrode side after removing the magnesium oxide mono-crystalline substrate. Accordingly, electrical connection is completed just by dripping an appropriate amount of conductive paste on portions where the electrode pads of the flexible substrate are provided adjacent to the external electrode connections. An electrical connection process can thus be extremely simplified.

Exemplary embodiments are further detailed below with reference to drawings.

First Exemplary Embodiment

FIG. 1 is an exploded perspective of a micro-transfer device in a first exemplary embodiment of the present invention. In FIG. 1, expandable element 1 has expandable members 101 and 102 which have mirror symmetry (or Reflection-type symmetry) to each other. Expandable members 101 and 102 are configured by forming first driving electrodes 301 and 302 made of platinum (Pt) on piezoelectric members 201 and 202 made of lead titanate zirconate; forming insulator 7 made of polyimide beneath piezoelectric members 201 and 202, and then forming second driving electrode 4 made of Pt beneath insulator 7. Here, first driving electrodes 301 and 302 and piezoelectric members 201 and 202 have almost the same shape and area, and second driving electrode 4 of two expandable members 101 and 102 is electrically connected. Expandable element 1 as configured above is bonded to flexible substrate 9 by adhesive member 8. Flexible substrate 9 has an area fixed to fixing substrate 11 and an unfixed area.

Figure 2:
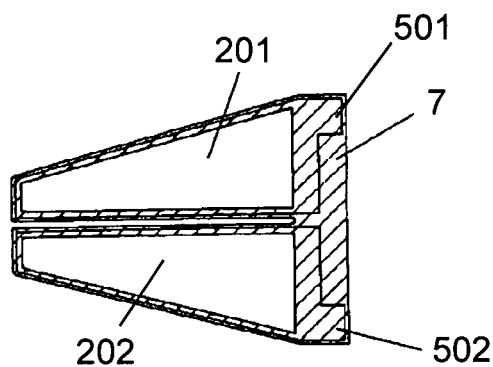
FIG. 2 is an exploded plan view of a part concerned of the micro-transfer device in accordance with the first exemplary embodiment of the present invention.
Figure 3:
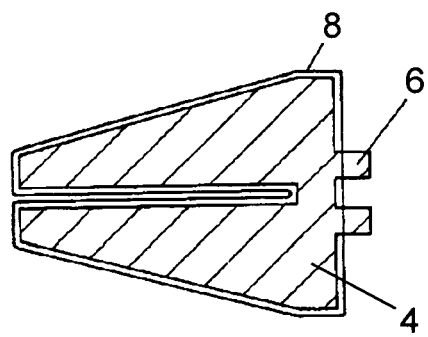
FIG. 3 is an exploded plan view of a part concerned of the micro-transfer device in accordance with the first exemplary embodiment of the present invention.
Figure 4:
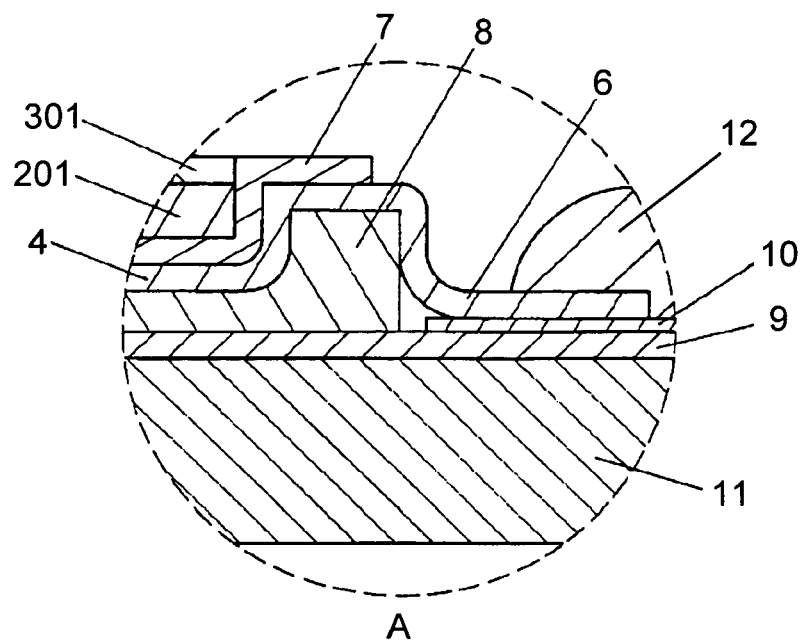
FIG. 4 is a magnified section view of a part concerned of the micro-transfer device in accordance with the first exemplary embodiment of the present invention.

FIG. 2 is a plan view of the insulator formed on the piezoelectric member. As shown in FIGS. 1 and 2, insulator 7 has a frame shape which covers only the periphery of piezoelectric members 201 and 202 out of the area fixed to fixing substrate 11. In the fixed area, insulator 7 fully covers the surface of piezoelectric members 201 and 202. Adhesive member 8 bonding flexible substrate 9 and expandable element 1 has a shape to expose a part of external electrode connection 6 of the second driving electrode formed at an end of expandable element 1. FIG. 3 is a plan view illustrating adhesive member 8 formed on second driving electrode 4. As shown in FIG. 3, an exposed area is determined in a way that a distance between an end of the adhesive member and an end of each external electrode connection 6 is greater than the film thickness of the adhesive member. Electrode pads 10 are formed on flexible substrate 9, and they are formed at positions facing external electrode connections 501, 502, and 6 of expandable element 1. As shown in FIG. 4, external electrode connections 6 of second driving electrode 4 and electrode pads 10 on flexible substrate 9 are electrically connected using conductive paste 12. In the same way, although not illustrated, first driving electrodes 301 and 302 are electrically connected to electrode pads 10 corresponding to respective external electrode connections 501 and 502 by applying conductive paste.

In the micro-transfer device as configured above, voltage is applied between left and right first driving electrodes 301 and 302 and second driving electrode 4 of expandable element 1 by supplying voltage to a connector drawn out from electrode pad 10 on flexible substrate 9. This makes piezoelectric members 201 and 202 deform, and results in also deforming flexible substrate 9. Accordingly, pulling or pushing force is applied to base 13 having a magnetic head which is connected to one end of flexible substrate 9, causing base 13 to move. When a predetermined voltage is applied to expandable members 101 and 102, and these expandable members are designed to expand and contract oppositely, the turning moment is applied to the base. This makes the base slightly move vertically. If expandable members 102 and 103 are designed to expand or contract in the same direction simultaneously, the base slightly moves horizontally.

In the first exemplary embodiment, external electrode connections 501, 502, and 6 are provided at an area where expandable element 1 is fixed to fixing substrate 11. Accordingly, expandable element 1 deforms only in an unfixed area, and thus no mechanical stress is applied to external electrode connections 501, 502, and 6. This maintains good electrical connection, offering a highly reliable micro-transfer device.

Moreover, insulator 7 has a frame shape which covers only the periphery of piezoelectric members 201 and 202 in the area not fixed to fixing substrate 11, and second driving electrode 4 is formed beneath this insulator 7. Accordingly, insulator 7 does not disturb a contact between second driving electrode 4 and piezoelectric members 201 and 202 at a practically expanding or contracting area. This eliminates the occurrence of electrical shorting between first driving electrodes 301 and 302 and second driving electrode 4. When Pt is used for the first driving electrode and a different metal such as chrome is used for the second driving electrode, the electromotive force generally generates between different types of metals. However, in the present invention, since insulator 7 exist on end faces of first driving electrodes 301 and 302 and second driving electrode 4, electrolyte used typically in the wet etching process does not contact these end faces. This reduces the possibility of corrosion of end faces by a local cell mechanism.

Still more, first driving electrodes 301 and 302, and piezoelectric members 201 and 202 have almost the same shape and area. This enables a supply of uniform voltage to piezoelectric members 201 and 202, achieving stable and maximum displacement.

Still more, insulator 7 has a shape to cover the entire piezoelectric members 201 and 202 at the area fixed to fixing substrate 11. This further prevents shorting between first driving electrodes 301 and 302 and second driving electrode 4. In addition, when voltage is supplied between these electrodes, voltage practically supplied is not applied to piezoelectric members 201 and 202 because insulator 7 is made of polymide which has sufficiently lower dielectric constant than that of lead zirconate titanate which is used for piezoelectric members 201 and 202. In other words, two expandable members do not deform in the area on fixing substrate 11, assuring further stable voltage supply.

In addition, since external electrode connection 6 of second driving electrode 4 has a shape that protrudes from the outline of insulator 7, external electrode connection 6 is exposed on the top face. This enables a supply of voltage from the top face to second driving electrode 4, facilitating electrical connection with electrode pad 10 of flexible substrate 9 using conductive paste 12.

Figure 5A:
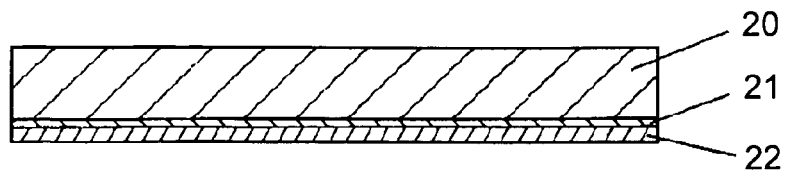
FIGS. 5A to 5H illustrate manufacturing processes of the micro-transfer device in accordance with the first exemplary embodiment of the present invention.
Figure 5B:
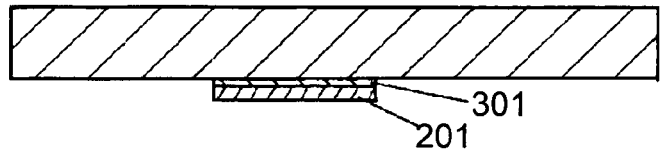
Figure 5C:
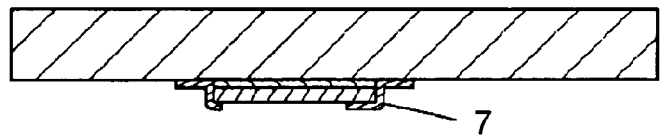
Figure 5D:
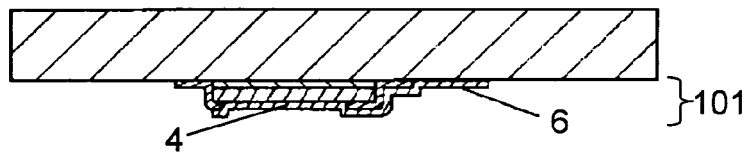
Figure 5E:
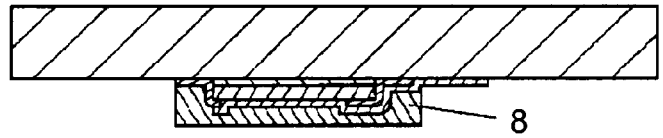
Figure 5F:
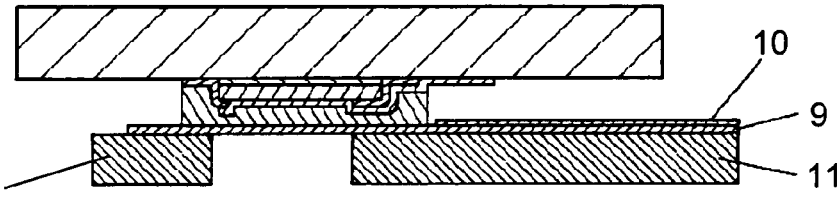
Figure 5G:
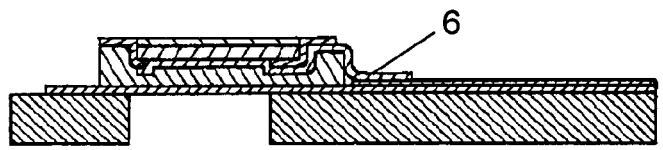
Figure 5H:
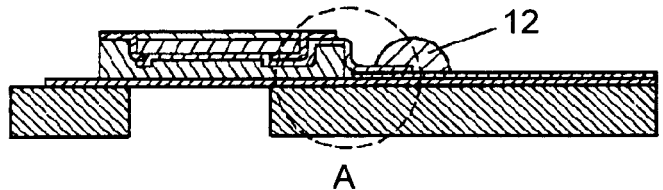

FIG. 4 is a section view of external electrode connection 6 corresponding to Part A in FIG. 5H. As shown in FIG. 4, a distance between an end of external electrode connection 6 and an end of adhesive member 8 is set to be greater than the film thickness of adhesive member 8 for bonding flexible substrate 9 and expandable element 1. This allows external electrode connection 6 to bend along the outline of adhesive member 8. Electrical connection between external electrode connection 6 and electrode pad 10 is thus further facilitated. Even if a gap is created due to insufficient bending of external electrode connection 6, conductive paste 12 applicable to this gap assures electrical connection.

Next, a method for manufacturing the first exemplary embodiment of the present invention is described. FIGS. 5A to 5H are section views for illustrating the method for manufacturing the first exemplary embodiment of the present invention. First, as shown in FIG. 5A, Pt as first conductive layer 21 and lead titanate zirconate as piezoelectric layer 22 are consecutively sputtered on magnesium oxide mono-crystalline substrate 20. This forms high-quality Pt and lead titanate zirconate layers on magnesium oxide mono-crystalline substrate 20. As detailed later, since magnesium oxide mono-crystalline substrate 20 can be easily removed by etching, multiple expandable elements 1 can be created by forming them on the substrate and then removing magnesium oxide mono-crystalline substrate 20.

Next, as shown in FIG. 5B, first conductive layer 21 and piezoelectric layer 22 are consecutively etched using the same photo mask to form piezoelectric member 201 and first driving electrode 301 which have almost the same shape. There are dry etching and wet etching, and the finishing shape slightly differs. However, as long as first conductive layer 21 and piezoelectric layer 22 are consecutively etched, either wet or dry etching is applicable. Consecutive etching of the first conductive layer and the piezoelectric layer using the same mask eliminates deviation in patterns which unavoidably occurs when the mask is changed. Accordingly, multiple high-quality first driving electrodes 301 and piezoelectric members 201 can be easily and stably formed on magnesium oxide mono-crystalline substrate 20.

Next, as shown in FIG. 5C, polyimide is formed using photolithography as insulator 7. Insulation 7 is formed in a way to cover entire piezoelectric member 201 in an area to be fixed to fixing substrate 11 later, and cover only an end of piezoelectric member 201 at an unfixed area. Since polyimide is used for insulator 7, it can be easily formed at once into a frame shape which covers entire piezoelectric member 201 in the area to be fixed to fixing substrate 11 and covers only the end of piezoelectric member 201 in the unfixed area using photolithography. This eliminates deformation of expandable element 1 in the area fixed to fixing substrate 11 when second driving electrode 4 is formed later, but voltage can be uniformly and stably supplied to the unfixed area.

Next, as shown in FIG. 5D, second driving electrode 4 is formed on piezoelectric member 201 and insulator 7 using photolithography. This makes piezoelectric member 201 have insulator 7 at its periphery and sandwiched by first driving electrode 301 and second driving electrode 4. Conductive materials such as Pt, chrome, gold, and Cu are suitable for the electrode. Here, a part of external electrode connection 6 is formed in a way to protrude from the outline of insulator 7 in the area fixed to fixing substrate 11. Since the external electrode connection is exposed on the top face when magnesium oxide mono-crystalline substrate 20 is etched in a later process, electrical connection from the top face is facilitated. In addition, since electrode pad 10 is provided on the flexible substrate 9 in a later process, electrical connection is established just by applying an appropriate amount of conductive paste.

Still more, second driving electrodes 4 of two expandable members (101 and 102 in FIG. 1) of expandable element 1 are configured to be electrically connected for a common electrode. The effect of electrically connecting second driving electrodes 4 are detailed later. In short, electrical connection of external electrode connection 6 and electrode pad 10 on the flexible substrate can be checked just by measuring electrical resistance at the connector of the flexible substrate.

Next, as shown in FIG. 5E, adhesive member 8 is formed by photolithography in a way to expose a part of external electrode connection 6. An end of adhesive member 8 is patterned at a position further inward than the end of external electrode connection for a distance greater than the thickness of adhesive member 8. This allows exposed external electrode connection 6 to freely bend when magnesium oxide mono-crystalline substrate 20 is removed in a later process. The external electrode connection bent in a way to cover the end face of adhesive member 8 can easily contact electrode pad 10 on the flexible substrate beneath.

Next, as shown in FIG. 5F, flexible substrate 9 and expandable element 1 are positioned and pasted.

Then, as shown in FIG. 5G, magnesium oxide mono-crystalline substrate 20 is removed using the phosphate solution. This makes expandable element 1 detached from magnesium oxide mono-crystalline substrate 20, and being formed on flexible substrate 9. In other words, although expandable element 1 is small and fragile, it can be handled easily because expandable element 1 is fixed to magnesium oxide mono-crystalline substrate 20 until it is bonded to flexible substrate 9.

Next, as shown in FIG. 5H, conductive paste 12 is applied for an appropriate amount to external electrode connection 501 and the connection of electrode pad 10. This establishes electrical connection of external electrode connection 501 and electrode pad 10. After magnesium oxide mono-crystalline substrate 20 is removed, the external electrode connection is exposed on the surface. Accordingly, connection of flexible substrate 9 and electrode pad 10 is completed just by applying an appropriate amount of conductive paste 12 to ends of external electrode connections 501 and 502. If external electrode connection 501 and electrode pad 10 are not electrically connected due to insufficient bending of external electrode connection 6 when external electrode connection 6 is bent in a way to cover the end of adhesive member 8, as described above, to contact electrode pad 10, conductive paste 12 can be applied to this portion in an appropriate amount. This makes conductive paste flow into a gap created between external electrode connection 6 and electrode pad 10, further ensuring electrical connection.

Lastly, electrical resistance of connector 14 provided on flexible substrate 11 is measured. Since second driving electrodes 4 of expandable element 1 are electrically connected to form a common electrode structure, electrical resistance is shorted if electrical connection of external electrode connection 4 and electrode pad 10 are properly established. Accordingly, whether electrical connection is properly established can be easily checked by measuring this electrical resistance. In addition, for checking electrical connection of external electrode connection 501 of first driving electrode 301 and electrode pad 10 of flexible substrate 11, electrical capacitance between the first driving electrode and second driving electrode of connector 14 provided on flexible substrate 11 is measured. If electrical capacitance conforms to the capacitance calculated based on the area of piezoelectric member 201, electrode pad 10 is properly connected.

The above manufacturing method of the present invention allows the manufacture of multiple expandable elements on the magnesium oxide mono-crystalline substrate. This facilitates the manufacture of multiple high-quality micro-transfer devices simultaneously.

Second Exemplary Embodiment

Figure 6:
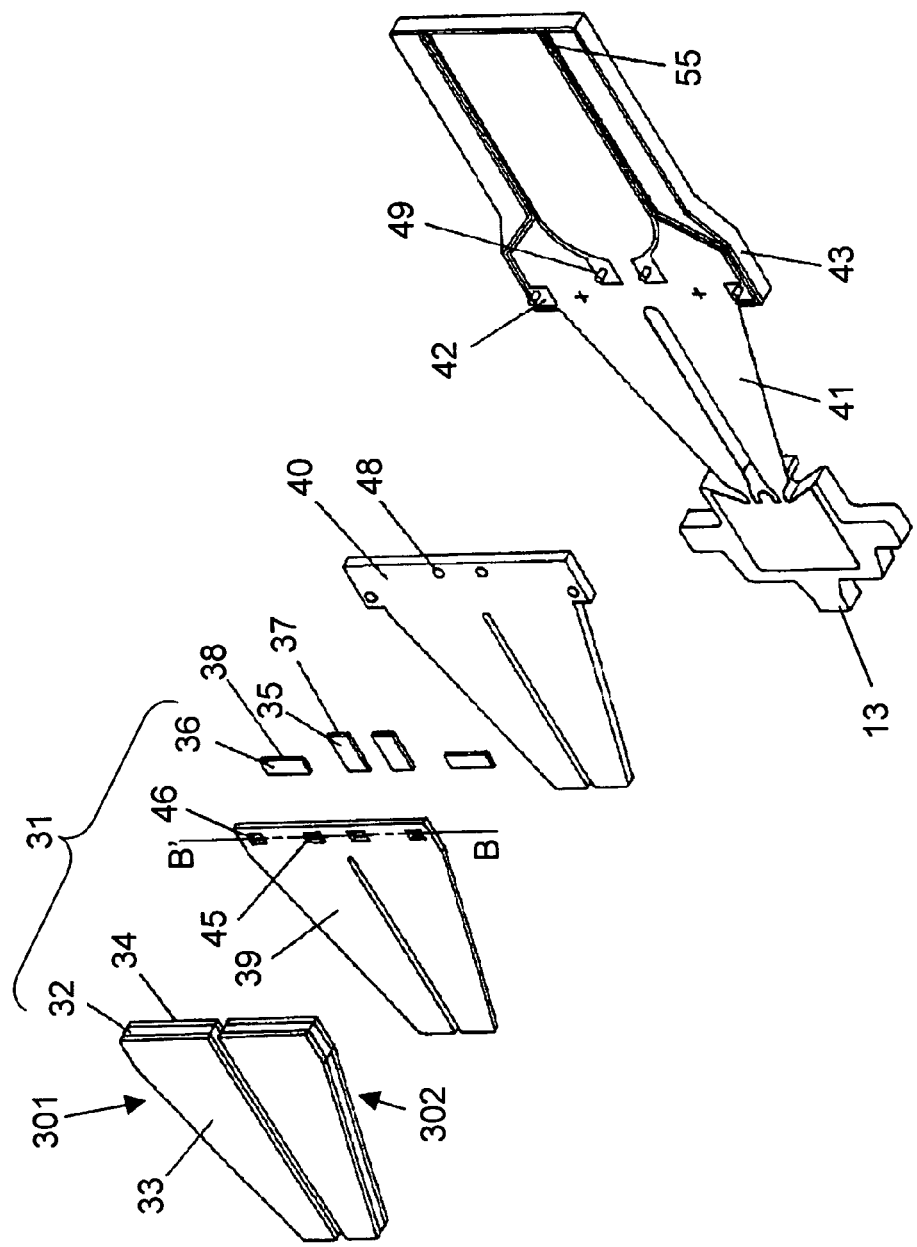
FIG. 6 is an exploded perspective of a micro-transfer device in accordance with a second exemplary embodiment of the present invention.

FIG. 6 is an exploded perspective view of a micro-transfer device in a second exemplary embodiment of the present invention. In FIG. 6, expandable element 31 has expandable members 301 and 302 which have mirror symmetry to each other. The second exemplary embodiment is detailed below typically using piezoelectric member 32, first driving electrode 33, and second driving electrode 34 of expandable member 301, which is one of the expandable members of expandable element 31. Expandable element 31 configures piezoelectric element by forming first driving electrode 33 made of platinum (Pt) over piezoelectric member 32 made of lead titanate zirconate, forming second driving electrode 34 made of Pt beneath piezoelectric member 32. Insulation 39 made of polyimide contacts second driving electrode 34 from underneath. Moreover, second lead-out electrode 35 and first lead-out electrode 36 made of gold (Au) are formed beneath insulator 39. Here, first driving electrode 33, piezoelectric member 32, and second driving electrode 34 have almost the same shape and area. FIGS. 7A and 7B are section views of an area where expandable element 31 is fixed onto fixing substrate 43 (a section view taken along Line B–B' in FIG. 6). Third through-hole 47 is formed in piezoelectric member 32 and second driving electrode 34 at an area magnified in FIG. 7B. The diameter of this third through-hole 47 is narrower at the first driving electrode 33 side. In addition, second through-hole 45 and first through-hole 46 are formed in insulator 39. First through-hole 46 has a diameter further smaller than the smaller diameter of third through-hole 47. Second lead-out electrode 35 contacts second driving electrode 34 through second through-hole 45 on insulator 39, and first lead-out electrode 36 contacts first driving electrode 33 through first through-hole 46 created on insulator 39. External electrode connections 37 and 38 are provided on one end of second lead-out electrode 35 and first lead-out electrode 36 in an area fixed to fixing substrate 43. Expandable element 31 consisted of expandable members 301 and 302 as configured above is bonded on flexible substrate 41 by adhesive member 40. Fourth through-hole 48 which exposes a part of external electrode connections 37 and 38 is created on adhesive member 40 which fixes flexible substrate 41 and expandable element 31. In addition conductive protrusion 49 made typically of copper (Cu) or Au is formed on electrode pad 42 of flexible substrate 41. This protrusion 49 is disposed at a position corresponding to fourth through-hole 48 on external electrode connections 37 and 38 when expandable element 31 faces flexible substrate 41. External electrode connections 37 and 38 and protrusions 49 are electrically connected via fourth holes 48.

In the second exemplary embodiment, first driving electrode 33, piezoelectric member 32, and second driving electrode 34 have almost the same shape so that voltage can be uniformly supplied to entire piezoelectric member 32. Since both first driving electrode 33 and second driving electrode 34 are made of Pt, no electric potential difference between metals of both electrodes occurs. This reduces the possibility of corrosion of piezoelectric member 32 by the local cell mechanism.

In the area where expandable element 31 is fixed to fixing substrate 43, second lead-out electrode 35 contacts second driving electrode 34 through second through-hole 45 provided on insulator 39. Accordingly, second lead-out electrode 35 is drawn out to the flexible substrate 41 side without electrically shorting with first driving electrode 33. Moreover, since the inner wall of third through-hole 47 is inclined to make the diameter at the first driving electrode 33 side narrower and the diameter of first through-hole 46 is further narrower than this diameter, first lead-out electrode 36 is unlikely to disconnect from the wall of the through-hole. In addition, no shorting with second driving electrode 34 occurs. Accordingly, first lead-out electrode 36 is securely drawn out to the flexible substrate 41 side.

Moreover, a part of external electrode connections 37 and 38 provided on second lead-out electrode 35 and first lead-out electrode 36 are exposed from adhesive member 40, and conductive protrusion 49 is provided on flexible substrate 41 at a position facing this fourth through-hole 48. Since the height of protrusion 49 is greater than the thickness of adhesive member 40, a secure electrical connection is achieved. If first lead-out electrode 36 is not provided, electrical connection can be established by the use of conductive paste as described in the first exemplary embodiment.

As described above, all electrical connections are established in the area in which expandable element 31 is fixed. Accordingly, no instability in electrical connection occurs by supplying voltage to expand or contract expandable element 31, ensuring stable voltage supply.

Figure 8A:
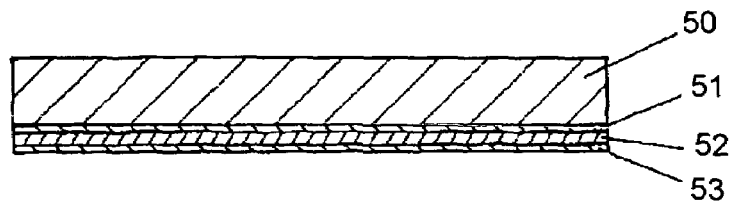
FIGS. 8A to 8G illustrate manufacturing processes of the micro-transfer device in accordance with the second exemplary embodiment of the present invention.

Next, a method for manufacturing the micro-transfer device in the second exemplary embodiment of the present invention is described with reference to drawings. FIGS. 8A to 8G and FIGS. 9A to 9E are section views illustrating how to manufacture the micro-transfer device in the second exemplary embodiment. In FIG. 8A, Pt as first conductive layer 51 and lead titanate zirconate as piezoelectric layer 52 are consecutively sputtered on magnesium oxide mono-crystalline substrate 50. Then, Pt as second conductive layer 53 is formed under the same conditions as first conductive layer 51. This allows formation of high-quality Pt and lead titanate zirconate layers on magnesium oxide mono-crystalline substrate 50. Since magnesium oxide mono-crystalline substrate 50 can be easily removed by etching, as in the first exemplary embodiment, multiple expandable elements 31 can be manufactured at once by removing magnesium oxide mono-crystalline substrate 50 after forming plural expandable elements 31 on the substrate although expandable elements 31 are small and fragile. In addition, if first driving electrode 33 and second driving electrode 34 are formed under the same conditions, a film stress generated by a interaction between these layers and the magnesium oxide mono-crystalline substrate are applied in the same direction, increasing the film adhesivity because there is no unfavorable stress.

Figure 8B:

As shown in FIG. 8B, first conductive layer 51, piezoelectric layer 52, and second conductive layer 53 are consecutively etched using the same photo mask so that first driving electrode 33, piezoelectric member 32, and second driving electrode 34 will have almost the same shape. Here, it is preferable to use dry etching. In case of using wet etching for a single mask, a thick layer may be side-etched deeply. If piezoelectric member 32 is thick, a side etching occurs to piezoelectric member 32, causing electrical short-circuit between first driving electrode 33 and second driving electrode 34. In the manufacturing method of the second exemplary embodiment of the present invention, the first conductive layer, piezoelectric layer, and second conductive layer are consecutively dry-etched using the same mask. This avoids the short-circuit, and also eliminates pattern deviation which unavoidably occurs when the mask is changed. Accordingly, the second exemplary embodiment facilitates the stable manufacture of a high-quality plural first driving electrodes 33, piezoelectric members 32, and second driving electrodes 34 on magnesium oxide mono-crystalline substrate 50 at once.

Figure 9A:
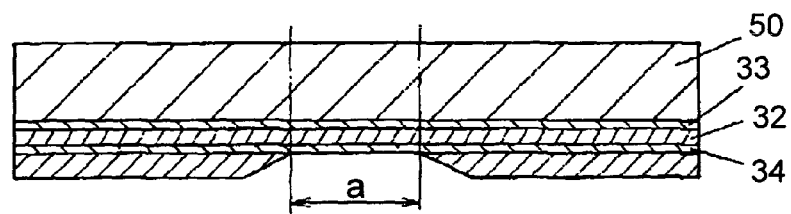
FIGS. 9A to 9E illustrate manufacturing processes of the micro-transfer device in accordance with the second exemplary embodiment of the present invention.
Figure 9B:
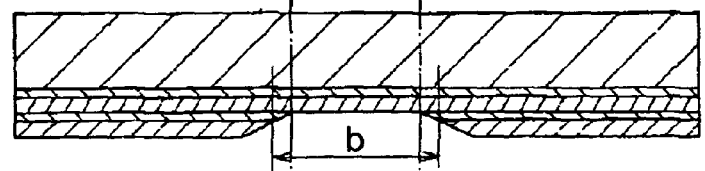
Figure 9C:
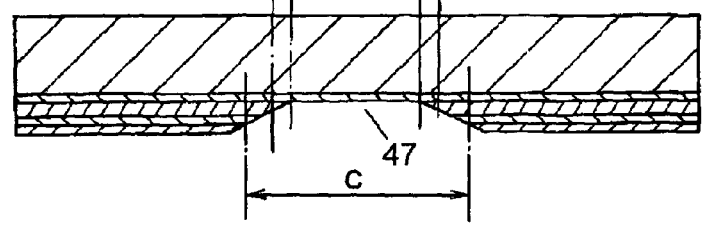

Next, FIGS. 9A to 9E are section views magnifying an area where the third through-hole 47 is formed. The formation of this third through-hole 47 is detailed next. As shown in FIG. 9A, the normal photo resist is tapered in a way that the film thickness is thinner toward the opening, and thus the initial resist is formed along Line a. When second driving electrode 34 and piezoelectric layer 32 are dry-etched in this state, the resist line is retreated, as shown in FIG. 9B, because the photo resist near the opening is dry-etched. In other words, the resist line retreats from Line b to Line c, and consequently second driving electrode 34 and piezoelectric member 32 are tapered as shown in FIG. 9C. More specifically, the diameter of an exposed area of first driving electrode 33 becomes smaller than that of second driving electrode 34. This reduces defects of the insulator, which will be formed in a later process, and first lead-out electrode 36, assuring electrical connection.

Figure 8C:
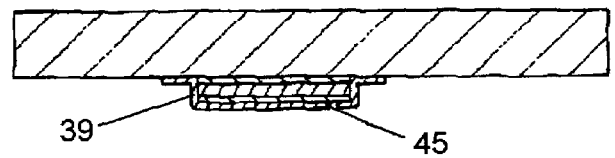
Figure 9D:
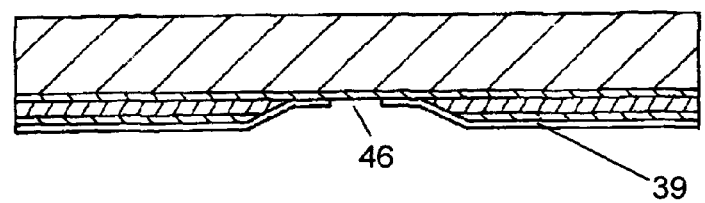

Next, as shown in FIGS. 8C and 9D, insulator 39 is formed by photolithography. Second through-hole 45 and first through-hole 46 are formed on insulator 39 in an area where expandable element 31 is fixed to fixing substrate 43. First through-hole 46 is formed so that insulator 39 covers around third through-hole 47 formed earlier. In other words, first through-hole 46 has a smaller diameter than third through-hole 47. This ensures the formation of second lead-out electrode 35 and first lead-out electrode 36 without a short-circuit.

Figure 8D:
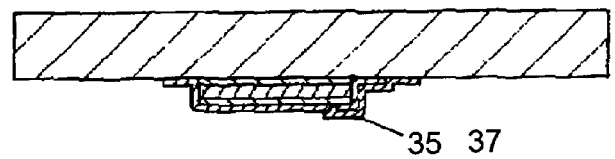
Figure 9E:
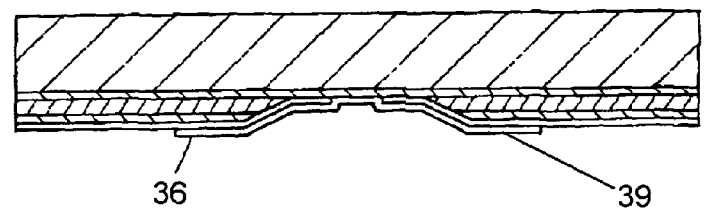

Next, as shown in FIGS. 8D and 9E, second lead-out electrode 35 and first lead-out electrode 36 made mainly of Au are formed by photolithography. Since Au can be etched by iodine/potassium iodide solution, other materials are not damaged.

Figure 8E:
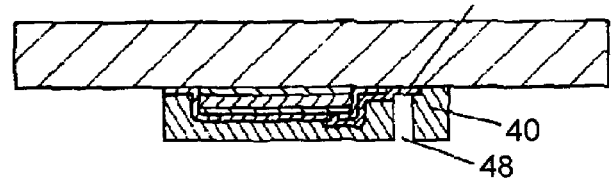

Next, as shown in FIG. 8E, adhesive member 40 is patterned by photolithography. Here, fourth through-holes 48 are formed in a way to expose a part of external electrode connections 37 of second lead-out electrodes 35 and external electrode connections 38 of first lead-out electrodes 36. The exposed area is set to be larger than protrusion 49 provided on electrode pad 42 of flexible substrate 41. This enables fitting of fourth through-hole 48 and protrusion 49, facilitating a process to overlay expandable element 31 on flexible substrate 41. Moreover, since an area of protrusion 49 is smaller than an area of fourth through-hole 48, an allowance is secured for fitting. This also facilitates the overlay adjustment in a later process. Still more, since protrusion 49 is made of a conductive material in the second exemplary embodiment, electrical connection is established by fitting.

Figure 8F:
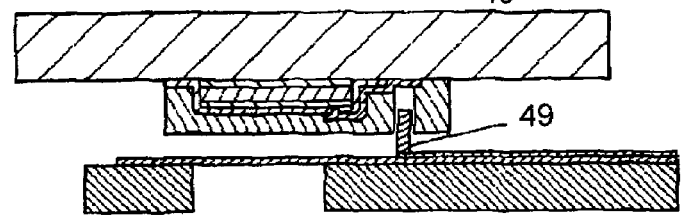

Next, as shown in FIG. 8F, expandable element 31 is overlaid on flexible substrate 41. The overlaying position is adjusted by measuring electrical capacitance of the connector provided on flexible substrate 41. In other words, fourth through-hole 48 on external electrode connection 37 of expandable element 31 and protrusion 49 on electrode pad 42 of flexible substrate 41 contact when expandable element 31 and flexible substrate 41 are properly overlaid and matched. Accordingly, electrical capacitance caused by piezoelectric member 32 is detected between first driving electrode 33 and second driving electrode 34. This method thus allows for curing of adhesive after confirming the overlaid position and electrical connection.

Figure 8G:
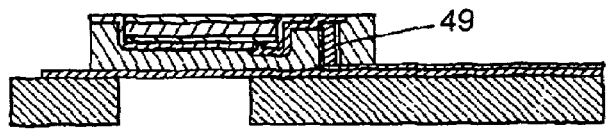

Lastly, as shown in FIG. 8G, magnesium oxide monocrystalline substrate 50 is removed using the phosphoric acid solution to complete the micro-transfer device.

As described in the above exemplary embodiments, the present invention thus offers manufacture of plural high-quality micro-transfer devices at once.

INDUSTRIAL APPLICABILITY

The micro-transfer device of the present invention is employed for finely adjusting the recording head position at the tip, and one end of the micro-transfer device is firmly fixed onto the fixing substrate. Voltage is supplied from the electrode pad on the flexible substrate to the external electrode connection provided on the fixing substrate. This eliminates deformation of the voltage feeder even during high-speed movements of the head supporting mechanism. The stable voltage supply thus facilitates the fine adjustment of the position of the magnetic head.

Moreover, Pt is sputtered on the magnesium oxide monocrystalline substrate as the first driving electrode and lead titanate zirconate is sputtered as the piezoelectric member. This allows the simultaneous formation of multiple expandable elements and electrical signal connections, and also allows expandable elements to be pasted simultaneously onto the flexible substrate, facilitating the production of inexpensive micro-transfer devices.

The micro-transfer device of the present invention has potential for use in recording and playback apparatus for recording disks which require high speed and high precision positioning of the recording head, such as magnetic recording media, optical magnetic recording media, and optical recording media. Furthermore, the micro-transfer device of the present invention is applicable as a head transfer device, typically in a scanning tunnel microscope, since the present invention achieves accurate positioning.

The invention claimed is:

1. A micro-moving device comprising:
an expandable element which expands and contracts by applying voltage;
a flexible substrate bonded to said expandable element by an adhesive member; and
a base connected to a first end of said flexible substrate;
wherein said expandable element and said flexible substrate are fixed onto a fixing substrate at a second end of said flexible substrate different than said first end of said flexible substrate;
wherein said expandable element comprises
an external electrode connection for inputting voltage,
a piezoelectric member,
a first driving electrode and a second driving electrode, said first and second driving electrodes sandwiching said piezoelectric member,
an insulator between said second driving electrode and said flexible substrate, said insulator covering an entire surface of said piezoelectric member, and
a first lead-out electrode and a second lead-out electrode between said insulator and said flexible substrate, said first lead-out electrode being connected to said first driving electrode, and said second lead-out electrode being connected to said second driving electrode,
wherein said first driving electrode has approximately the same shape as said piezoelectric member,
wherein said second driving electrode is disposed above said flexible substrate via said adhesive member,
wherein said flexible substrate has an electrode pad for supplying voltage to said expandable element at a position disposed on said fixing substrate,
wherein a part of said first lead-out electrode acts as a first external electrode connection, and a part of said second lead-out electrode acts as a second external electrode connection,
wherein said external electrode connection is connected to said electrode pad using a conductive material; and
wherein said base moves by signal voltage supplied from an external source to said expandable element.

2. The micro-moving device as defined in claim 1, wherein said insulator covers inside and outside of a periphery of said piezoelectric member, and said insulator also covers a surface of said piezoelectric member disposed above said fixing substrate.

3. The micro-moving device as defined in claim 1, wherein said piezoelectric member and one of said first driving electrode and said second driving electrode have an approximately same shape.

4. The micro-moving device as defined in claim 1, wherein a second through-hole is provided in said insulator at a position where said second lead-out electrode is overlaid on said second driving electrode; said second external electrode connection is disposed at a position facing said electrode pad; and said second external electrode connection and said electrode pad are connected by a conductive material.

5. The micro-moving device as defined in claim 1, wherein a third through-hole is provided in said piezoelectric member and said second driving electrode at a position where said first lead-out electrode is overlaid on said first driving electrode; a first through-hole is formed inside said third through-hole in said insulator covering said second driving electrode; said first external electrode connection is disposed at a position facing said electrode pad; and said first external electrode connection and said electrode pad are connected using said conductive material.

6. The micro-moving device as defined in claim 1, wherein said adhesive member covers said insulator, said first lead-out electrode, and said second lead-out electrode; and at least one fourth through-hole is provided in said adhesive member where said first external electrode connection faces said electrode pad and where said second external electrode connection faces said electrode pad.

7. The micro-moving device as defined in claim 6, wherein said electrode pad has a conductive protrusion, said protrusion contacting said first external electrode connection and said second external electrode connection through said at least one fourth through-hole.

8. The micro-moving device as defined in claim 1, wherein said piezoelectric member is mainly made of lead titanate zirconate, and one of said first driving electrode and said second driving electrode is made of platinum.

9. The micro-moving device as defined in claim 1, wherein one of said first lead-out electrode and said second lead-out electrode is mainly made of gold.

10. The micro-moving device as defined in claim 1, wherein said piezoelectric member of said expandable element constitutes a first piezoelectric member sandwiched by said first and second driving electrodes; said expandable element further comprises a second piezoelectric member sandwiched by additional first and second driving electrodes; said first and second piezoelectric members are supported on said flexible substrate and are mirror-symmetrical to each other about a center line; and said second driving electrodes of said first and second piezoelectric members, respectively, are electrically connected.

11. The micro-moving device as defined in claim 10, wherein an expansion and contraction direction of said first and second piezoelectric members upon application of voltage is parallel to said center line, and one of said first and second piezoelectric members expands when the other of said first and second piezoelectric members contracts.

12. The micro-moving device as defined in claim 1, wherein said insulator is mainly made of polyamide.

13. A method for manufacturing a micro-moving device, said micro-moving device comprising a piezoelectric element in which a first driving electrode and a second driving electrode are formed on both faces of a piezoelectric member, a flexible substrate bonded to said piezoelectric element, a lead-out electrode for supplying voltage to said piezoelectric element, and a base connected to one end of said flexible substrate, said method comprising:

forming a piezoelectric element, said forming of said piezoelectric element comprising
forming a first driving electrode layer on a magnesium oxide mono-crystalline substrate, said first driving electrode layer being mainly made of platinum,
forming a piezoelectric layer on said first driving electrode layer, said piezoelectric layer being mainly made of lead titanate zirconate,
patterning said first driving electrode layer and said piezoelectric layer, and
forming a second driving electrode layer on said piezoelectric layer, said second driving electrode layer being mainly made of one of platinum, chrome, copper, and gold;
bonding said piezoelectric element and a flexible substrate using adhesive;
fixing an end of said flexible substrate to a fixing substrate, said end being different from said one end connected to said base; and
removing said magnesium oxide mono-crystalline substrate, after fixing, by etching.

14. The method for manufacturing a micro-moving device as defined in claim 13, further comprising forming an insulator before said forming of said second driving electrode layer; said insulator being patterned in a way to cover an inside and an outside of a periphery of said piezoelectric member and also cover a surface of said piezoelectric member disposed above said fixing substrate.

15. The method for manufacturing a micro-moving device as defined in claim 13, wherein a same pattern mask is used in said forming of said piezoelectric element for patterning said piezoelectric layer and said first driving electrode to an approximately same shape.

16. The method for manufacturing a micro-moving device as defined in claim 15, wherein an electrode pattern having a protrusion from said insulator toward said fixing substrate is formed in said forming of said second driving electrode.

17. The method for manufacturing a micro-moving device as defined in claim 13, wherein a same pattern mask is used in said forming of said piezoelectric element for patterning said piezoelectric layer, said first driving electrode layer, and said second driving electrode layer to an approximately same shape.

18. The method for manufacturing a micro-moving device as defined in claim 17, further comprising, after said forming of said second driving electrode layer:

forming an insulator, said insulator being patterned in a way to cover said piezoelectric member, and also having a window to expose said second driving electrode; and patterning said lead-out electrode in a way to include said window, said lead-out electrode being mainly made of one of aluminum, chrome, titanium, and gold.

19. The method for manufacturing a micro-moving device as defined in claim 17, further comprising forming a through-hole through said piezoelectric member and said second driving electrode layer after said forming of said second driving electrode layer.

20. The method for manufacturing a micro-moving device as defined in claim 17, wherein said bonding of said piezoelectric member and said flexible substrate includes an adjustment of patterns, said adjustment using a through-hole formed in an insulator which reaches said lead-out electrode and a protrusion formed on an electrode pad of said flexible substrate.

21. The method for manufacturing a micro-moving device as defined in claim 17, wherein said bonding of said piezoelectric member and said flexible substrate includes checking of an overlaid position by measuring one of electrical resistance and electrical capacitance between electrodes formed on said flexible substrate.

22. The method for manufacturing a micro-moving device as defined in claim 13 further comprising connecting said lead-out electrode and an electrode pad by conductive paste after said removing of said magnesium oxide mono-crystalline substrate.

* * * * *